United States Patent [19]

Suhan

[11] Patent Number: 5,737,298
[45] Date of Patent: Apr. 7, 1998

[54] HOLOGRAPHIC SECURITY SYSTEM FOR OPTICAL DISCS

[75] Inventor: John M. Suhan, Blakely, Pa.

[73] Assignee: WEA Manufacturing, Inc., Olyphant, Pa.

[21] Appl. No.: 708,456

[22] Filed: Sep. 5, 1996

Related U.S. Application Data

[60] Provisional application No. 60/003,215, Sep. 5, 1995.

[51] Int. Cl.$^6$ .................................. G11B 7/00; G01J 4/00
[52] U.S. Cl. .......................... 369/110; 369/58; 369/103; 356/369
[58] Field of Search ..................................... 369/100, 103, 369/109, 110, 112, 120, 53, 54, 58, 275.3, 283; 356/364, 366, 368, 369

[56] References Cited

U.S. PATENT DOCUMENTS

| | | | |
|---|---|---|---|
| 5,138,604 | 8/1992 | Umeda et al. | 369/103 |
| 5,549,953 | 8/1996 | Li | 369/283 X |
| 5,587,984 | 12/1996 | Owa et al. | 369/103 |
| 5,608,717 | 3/1997 | Ito et al. | 369/275.3 |

*Primary Examiner*—Paul W. Huber
*Attorney, Agent, or Firm*—Gottlieb, Rackman & Reisman, P.C.

[57] ABSTRACT

A technique for verifying the authenticity of a particular breed of pirated optical discs. By comparing the original source disc with the pirated version in the cross-polarization laser light of a polarimeter, the stress of the pirated replication will be revealed, verifying the existence of piracy.

3 Claims, 1 Drawing Sheet

HOLOGRAPHIC SECURITY SYSTEM FOR OPTICAL DISCS

This non-provisional application claims the benefit of U.S. Provisional application Ser. No. 60/003,215, filed on Sep. 05, 1995.

FIELD OF THE INVENTION

This invention relates to security markers to establish authenticity of a compact disc. In particular it concerns the detection of birefringence differences between genuine and unauthorized copies of compact discs.

BACKGROUND OF THE INVENTION

White light holograms have long been employed as a means for cosmetic enhancement, quite often in a manner suggesting the medium as an art form. Such holograms have been used as markers in plastic objects to defeat the attempt to copy the objects and pass the objects as authentic originals. Holograms are conventionally created by recording in an optical medium the interference pattern between coherent light reflected from an object and the same coherent light falling directly on the recording optical medium. When viewed, holograms provide images by the interference pattern of the same coherent light passing through the recorded image. The recorded hologram, being a recorded interference pattern is a record of the modulating of the phase of transmitted or reflected light and therefore its accurate copying requires processes that can copy dimension accurately to fractions of the wavelength of light, something on the order of 500 nm. It has been suggested that holograms could be placed in the non-data areas of compact discs using the same technology that provides the etching of pit depths during the preparation of a glass master for the manufacture of a compact disc due to the fact that such preparation ordinarily involves precise control of etched pits having a depth that is a fraction of the wavelength of light.

The present invention uses the term "holograph" in a broader sense to mean any recording of optical phase differences, in particular the data pits of an optical disc are considered to be a hologram to the extent that they are read by observing the interference or diffraction patterns of light reflected from the vicinity of such pits.

BRIEF DESCRIPTION OF THE INVENTION

The present inventor recognized that the key to using holographic structures as security measures lies in the fact that holographic images are sensitive to the phase shifts caused by small structural differences in the light reflecting medium. It became clear that such differences exist independently of the attempt to impart an artistically visible hologram in the medium and could be used to distinguish authentic copies from unauthorized copies of a master recording in compact disc format.

The present invention provides an apparatus for detecting the altered birefringence of light in counterfeited surfaces as a method for the detection of unauthorized copies. The method consists of comparing the effect of birefringence on the polarization of light affected by the original and suspected copy disc.

DETAILED DESCRIPTION OF A PREFERRED EMBODIMENT

Figure 1:
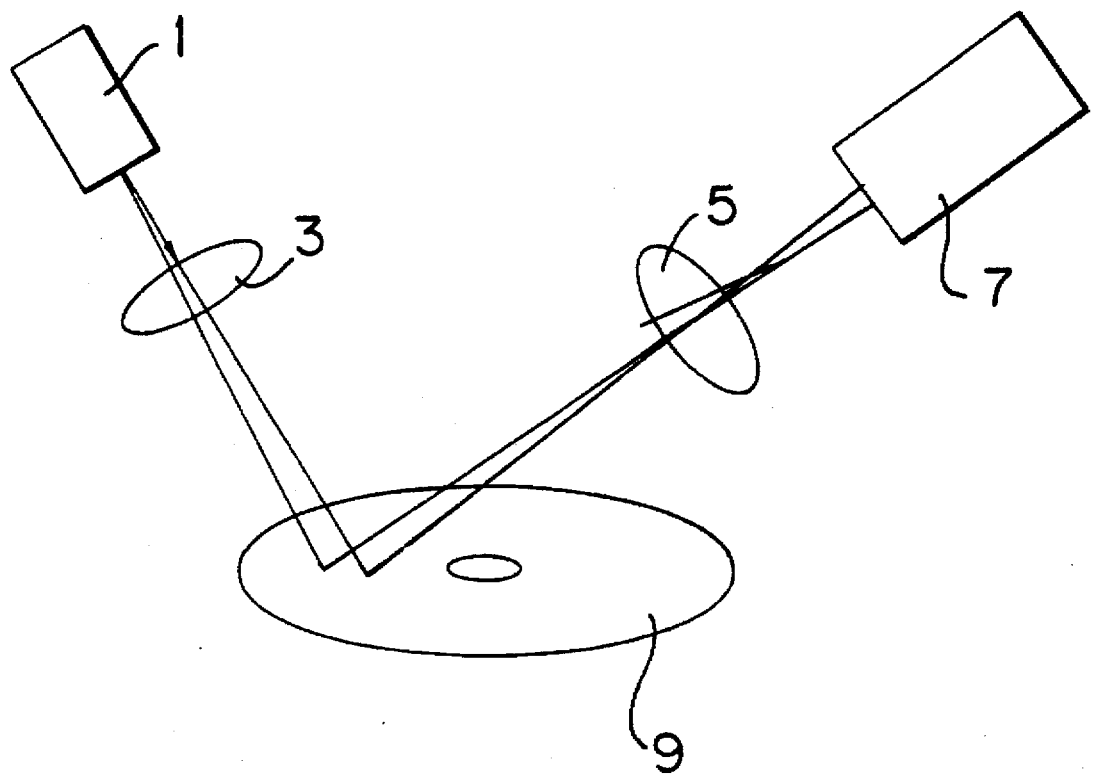
FIG. 1 is a schematic diagram of a system constructed in accordance with the present invention.

The discussion to follow utilizes the term "hologram" in two senses; first, in the traditional case and means of recording a white light hologram, and second, in considering the data pits of an optical disc to also be a hologram in the idea of a phase recording. Each sense is equivalent in this discussion.

The holographic form of an optical disc, whether cosmetic or data pits, must comply with a fixed set of rules to define its phase structure. This phase structure refers to the interference or diffraction that is observed by monochomatic light reflected from the data pits of the compact disc. The grating of the phase structure is typically defined by a depth of etch as well as etch pitch. Each of these parameters defines the appearance of the holographic form in a manner which allows holographic viewing or the retrieval of stored data.

Any variances of these parameters will alter the holographic viewing or data retrieval in a negative sense. While the performance or appearance of such an affected disc may not be degraded to an unacceptable point, such degradation may be detectable for use in the identification of replication piracy.

In particular, piracy, is often achieved by optically projecting the pit/land image (phase structure) in one-to-one scale onto some external photographic storage means. This storage means becomes the glass master-equivalent of a normal replication process.

Such a transfer will never exactly transfer in a one-to-one manner. Distortions develop in the wavefront during the course of the transfer. The depth of etch as well as the etch pitch of the pirated disc vary when compared to that of the original source disc. The holographic form becomes altered. The Holographic Security System for Optical Discs permits the detection of such variances in pirated optical discs.

When a suspected pirated disc is to be tested, the following procedure is appropriate. First, a copy of the original source disc must be provided, such that the original source copy and the pirated copy comprise a test group. Next, the original source copy must be placed in a polarimeter for material stress testing. As shown in FIG. 1, a polarimeter may consist simply of a laser 1, a linear polarizer 3, an analyzer 5 that is cross-polarized with the polarizer, and a photodetector 7. The original source copy 9 is placed in the polarimeter in between the polarizer and the analyzer, with the polarization axis of the analyzer 5 rotated to a point where the light reaching the photodetector is a minimum value. Once this condition is satisfied, cross-polarization is achieved.

At this point, the original source copy should be removed from the polarimeter and it should be replaced with the pirated copy of the optical disc. The differences in depth of etch and edge pitch variations present in the pirated disc will be revealed as an increase in light passed to the photodetector.

It is believed that the variation in polarization of the light received by the analyzer is due to the differences in stress imposed on the plastic medium during manufacture as a result of small differences in the configuration of the pits in the pirated copy. Thus although the pirated copy may be of sufficient accuracy to reproduce the data content of the original disc the stresses cause a difference in the birefringence of the plastic substrate in the pirated copy that it acquired during its own replication. Such stress induced birefringence is believed to be the reason that light will pass through the analyzer despite the cross-polarization set by the original disc. As a result, the pirated optical disc will be detected. The passage of light may be monitored by a CCD camera, in conjunction with a framegrabber and computer, for convenience.

The system for detecting pirated compact discs of the present invention is therefore rapid and economical.

While there have been shown and described and pointed out the fundamental novel features of the invention as applied to preferred embodiments thereof, it will be understood that various omissions and substitutions and changes in the form and details of the device illustrated and in its operation may be made by those skilled in the art without departing from the spirit of the invention, which is defined by the following claims.

I claim:

1. A method for detecting pirated copies of a bona-fide compact disc comprising
   (a) reflecting polarized light from a surface of a bona-fide compact disc,
   (b) passing the reflected polarized light through a polarization analyzer and into a photodetector, said photodetector comprising means to respond to light incident upon it,
   (c) replacing the bona-fide compact disc with a test disc and repeating steps (a)–(b) for said test disc,
   (d) comparing the response of the photodetector in steps (b) and (c), wherein a difference in response signifies that the test disc is a pirated copy.

2. The method for detecting pirated copies of claim 1, wherein said polarization analyzer is a linear polarizer.

3. The method for detecting pirated copies of claim 2, wherein said analyzer is a linear polarizer having an axis of polarization and wherein after step (b) the axis of said analyzer is rotated to achieve a minimum of intensity in said photodetector.

* * * * *